(12) United States Patent
Chikamori et al.

(10) Patent No.: US 11,879,748 B2
(45) Date of Patent: Jan. 23, 2024

(54) MAP INFORMATION SYSTEM

(71) Applicant: HONDA MOTOR CO., LTD., Tokyo (JP)

(72) Inventors: Hidetoshi Chikamori, Saitama (JP); Kazumasa Nakamura, Saitama (JP); Hitoshi Konishi, Saitama (JP); Takuji Harayama, Saitama (JP); Tomoaki Masakawa, Tokyo (JP); Naofumi Aso, Saitama (JP); Ryo Matsuzawa, Tokyo (JP); Zhaoqi Wang, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 203 days.

(21) Appl. No.: 17/571,588

(22) Filed: Jan. 10, 2022

(65) Prior Publication Data

US 2022/0221300 A1    Jul. 14, 2022

(30) Foreign Application Priority Data

Jan. 12, 2021   (JP) ................. 2021-002744

(51) Int. Cl.
*G01C 21/00* (2006.01)
*G06V 20/58* (2022.01)
(Continued)

(52) U.S. Cl.
CPC .......... *G01C 21/387* (2020.08); *B60W 40/08* (2013.01); *G01C 21/32* (2013.01);
(Continued)

(58) Field of Classification Search
None
See application file for complete search history.

(56) References Cited

U.S. PATENT DOCUMENTS 7,565,241 B2 *  7/2009  Tauchi ............... G01C 21/3815
                                                340/995.14
8,949,016 B1 *  2/2015  Ferguson ................ G01S 17/89
                                                340/436
(Continued)

FOREIGN PATENT DOCUMENTS

JP     H1019582 A     1/1998
JP    2003303389 A   10/2003
(Continued)

OTHER PUBLICATIONS

Notice of Reasons for Refusal for Japanese Patent Application No. 2021-002744 dated Nov. 1, 2022; 10 pp.

*Primary Examiner* — Adam M Queler
*Assistant Examiner* — Maria S Ayad
(74) *Attorney, Agent, or Firm* — Armstrong Teasdale LLP (57) ABSTRACT

A map information system includes: at least one vehicle; and a map server configured to communicate with the vehicle and store a high-precision map, wherein the vehicle includes: a turn signal lever sensor configured to detect a turn signal operation by a driver; an external environment sensor configured to acquire information on surroundings of the vehicle; an own vehicle position identifying device configured to identify a position of the vehicle; and a controller configured to transmit, to the map server, the turn signal operation, the position of the vehicle, and the information on the surroundings, and the map server updates the high-precision map based on the information acquired by the external environment sensor when comparing the high-precision map stored in the map server with the turn signal operation and determining that a branching route is present.

6 Claims, 7 Drawing Sheets

(51) Int. Cl.
*B60W 40/08* (2012.01)
*G01C 21/32* (2006.01)

(52) U.S. Cl.
CPC ..... *G01C 21/3815* (2020.08); *G01C 21/3841* (2020.08); *G01C 21/3848* (2020.08); *G01C 21/3856* (2020.08); *G01C 21/3859* (2020.08); *G01C 21/3896* (2020.08); *G06V 20/58* (2022.01); *B60W 2554/4041* (2020.02); *B60W 2554/4049* (2020.02)

(56) References Cited

U.S. PATENT DOCUMENTS

| | | | | |
|---|---|---|---|---|
| 9,658,074 | B2* | 5/2017 | Dorum | G01C 21/26 |
| 9,666,067 | B1* | 5/2017 | Nagpal | G08G 1/0112 |
| 10,215,572 | B2* | 2/2019 | Urano | G01C 21/3881 |
| 10,739,144 | B2* | 8/2020 | Watanabe | G01C 21/3848 |
| 10,883,835 | B2* | 1/2021 | Matsumoto | G09B 29/003 |
| 2002/0004701 | A1* | 1/2002 | Nakano | G08G 1/0969 |
| | | | | 709/217 |
| 2006/0217879 | A1* | 9/2006 | Ikeuchi | G01C 21/3844 |
| | | | | 701/409 |
| 2008/0120171 | A1* | 5/2008 | Ikeuchi | G01C 21/3837 |
| | | | | 705/13 |
| 2009/0125235 | A1* | 5/2009 | Chen | G01C 21/3848 |
| | | | | 701/414 |
| 2017/0066451 | A1* | 3/2017 | Moran | B60W 30/18118 |
| 2017/0138752 | A1* | 5/2017 | Mermelstein | G08G 1/161 |
| 2017/0166124 | A1* | 6/2017 | Nakagawa | G08G 1/163 |
| 2018/0058860 | A1* | 3/2018 | Matsumoto | G08G 1/0129 |
| 2018/0345960 | A1* | 12/2018 | Fujii | B60W 30/18163 |
| 2019/0179324 | A1 | 6/2019 | Rottkamp et al. | |
| 2019/0219405 | A1* | 7/2019 | Ewert | G01C 21/3848 |
| 2020/0051434 | A1* | 2/2020 | Sasaki | H04L 12/4625 |
| 2020/0064138 | A1* | 2/2020 | Takahama | G01C 21/3667 |
| 2020/0105132 | A1* | 4/2020 | Choi | G08G 1/0141 |
| 2020/0109953 | A1 | 4/2020 | Hokai et al. | |
| 2020/0139979 | A1* | 5/2020 | Kawanai | B60W 30/09 |
| 2020/0265242 | A1* | 8/2020 | Funahara | G06V 20/56 |
| 2020/0312143 | A1* | 10/2020 | Kamakura | G08G 1/096716 |
| 2021/0199463 | A1* | 7/2021 | Kitahara | B60W 60/001 |
| 2021/0256271 | A1* | 8/2021 | Shirai | G06V 20/58 |
| 2021/0325205 | A1* | 10/2021 | Lee | H04W 4/024 |
| 2022/0073090 | A1* | 3/2022 | Kakeshita | B60W 50/14 |
| 2023/0211726 | A1* | 7/2023 | Nehushtan | G01C 21/3807 |
| | | | | 701/117 |

FOREIGN PATENT DOCUMENTS

| | | |
|---|---|---|
| JP | 2004126035 A | 4/2004 |
| JP | 2006220499 A | 8/2006 |
| JP | 2007065042 A | 3/2007 |
| JP | 2008500561 A | 1/2008 |
| JP | 2015220729 A | 12/2015 |
| JP | 2016037266 A | 3/2016 |
| JP | 2016156973 A | 9/2016 |
| JP | 2016180980 A | 10/2016 |
| JP | 2017097088 A | 6/2017 |
| JP | 2018189900 A | 11/2018 |
| JP | 2019061414 A | 4/2019 |
| JP | 2020060369 A | 4/2020 |

* cited by examiner

MAP INFORMATION SYSTEM

TECHNICAL FIELD

The present invention relates to a map information system including a controller provided in a vehicle and a map server configured to store a high-precision map used for autonomous travel of the vehicle. In particular, the present invention relates to a map information system in which a map server updates a high-precision map based on information acquired by a sensor mounted on a vehicle.

BACKGROUND ART

A conventional map information system includes a database managing device that manages a map database so as to assist in driving of a vehicle (for example, JP2020-60369A). The map database stores map information indicating a position of a road surface marking corresponding to a stop line or a crosswalk.

The database managing device acquires, from the vehicle provided with an onboard sensor, driving environment information indicating a driving environment of the vehicle. Further, the database managing device acquires a road surface marking candidate and vehicle behavior based on the driving environment information. The road surface marking candidate is a candidate for the road surface marking around the vehicle. The vehicle behavior is behavior of the vehicle at a time when the vehicle passes by the road surface marking candidate. Further, the database managing device acquires, based on the vehicle behavior, an evaluation value indicating certainty of the road surface marking candidate, and registers the road surface marking candidate with the evaluation value equal to or higher than a threshold as the road surface marking in the map information.

In the map information system disclosed in JP2020-603693A, the road surface marking corresponding to a stop line or a crosswalk is acquired based on the driving environment information, and registered in the map information. However, information on a branching route is also required so as to cause the vehicle to travel autonomously. Accordingly, the development of a technique for acquiring information on the branching route based on information from a sensor provided in the vehicle is strongly desired so as to improve the accuracy of information included in a high-precision map.

SUMMARY OF THE INVENTION

In view of the above background, an object of the present invention is to provide a map information system that includes at least one vehicle and a map server configured to communicate with the vehicle and store a high-precision map, and can acquire information on a branching route and update the high-precision map when the branching route is newly established.

To achieve such an object, one aspect of the present invention provides a map information system (1, 101, 201), comprising: at least one vehicle (V); and a map server (3) configured to communicate with the vehicle and store a high-precision map, wherein the vehicle includes: a turn signal lever sensor (12A) configured to detect a turn signal operation by a driver; an external environment sensor (7) configured to acquire information on surroundings of the vehicle; an own vehicle position identifying device (10) configured to identify a position of the vehicle; and a controller (16) connected to the turn signal lever sensor, the own vehicle position identifying device, and the external environment sensor, and configured to transmit, to the map server, the turn signal operation, the position of the vehicle, and the information on the surroundings, and the map server updates the high-precision map based on the information acquired by the external environment sensor when comparing the high-precision map stored in the map server with the turn signal operation and determining that a branching route is present.

According to this aspect, the map server determines whether the branching route is newly established based on the turn signal operation, so that it is possible to more accurately determine and more quickly detect the new establishment of the branching route. Accordingly, it is possible to improve the accuracy of the high-precision map.

In the above aspect, preferably, the at least one vehicle comprises a plurality of vehicles, and the map server is configured to acquire, from each of the vehicles, the turn signal operation detected by the turn signal lever sensor and the position of the vehicle where the turn signal operation is performed, and determines whether the high-precision map needs to be updated based on the information from each of the vehicles.

According to this aspect, whether the high-precision map needs to be updated is determined based on the information from a plurality of vehicles. Accordingly, it is possible to prevent the high-precision map from being updated based on incorrect information, and thus improve the accuracy of the high-precision map.

In the above aspect, preferably, in a case where the high-precision map does not contain a road in a travel direction of one of the vehicles corresponding to the turn signal operation from the position of the one of the vehicles at detection of the turn signal operation, the map server determines whether travel histories of the vehicles after the turn signal operation are consistent with each other with respect to the vehicles traveling in a same travel direction, and in a case where the travel histories of the vehicles after the turn signal operation are consistent with each other, the map server determines that the high-precision map needs to be updated.

According to this aspect, whether the high-precision map needs to be updated is determined based on whether the travel histories of the vehicles are consistent with each other. Accordingly, it is possible to prevent the high-precision map from being updated based on incorrect information, and thus improve the accuracy of the high-precision map.

In the above aspect, preferably, the map server is configured to plot points indicating the travel histories of the vehicles after the turn signal operation, and determine whether the travel histories of the vehicles after the turn signal operation are consistent with each other based on density of the points indicating the travel histories.

According to this aspect, it is possible to easily determine whether the travel histories of the vehicles are consistent with each other.

In the above aspect, preferably, the map server determines that the travel histories of the vehicles after the turn signal operation are consistent with each other when the density of the points indicating the travel histories is equal to or more than a prescribed threshold.

According to this aspect, it is possible to easily determine whether the travel histories of the vehicles are consistent with each other.

In the above aspect, preferably, the at least one vehicle comprises a plurality of vehicles, the external environment sensor includes an imaging device configured to capture an image around each of the vehicles, and the map server is configured to acquire road information on a road on which each of the vehicles has traveled after the turn signal operation based on the image from each of the vehicles captured by the imaging device, and update the high-precision map based on the road information.

According to this aspect, the road information after the turn signal operation is acquired based on the image acquired by the imaging device. Accordingly, it is possible to appropriately acquire information on the branching route to be added to the high-precision map.

In the above aspect, preferably, the external environment sensor is configured to acquire road surface information on a road surface on which the vehicle travels, the controller is configured to transmit the road surface information acquired by the external environment sensor together with the position corresponding to the road surface information and identified by the own vehicle position identifying device, and the map server is configured to add the road surface information received from the controller to the high-precision map.

According to this aspect, information on a road surface state is added to the high-precision map. Accordingly, it is possible to cause the vehicle to travel more safely based on the road surface state.

In the above aspect, preferably, the map information system further comprises: an acceleration sensor (8A) configured to acquire acceleration and/or deceleration of the vehicle; and a steering angle sensor (13B) configured to acquire a steering angle, wherein the controller is configured to acquire the high-precision map from the map server, extract a shape of a road on which the vehicle travels from the high-precision map, and notifies the map server of inconsistency when the acceleration and/or deceleration acquired by the acceleration sensor or the steering angle acquired by the steering angle sensor is inconsistent with the extracted shape of the road.

According to this aspect, in a case where one of the acceleration and/or deceleration and the steering angle is not within a range to be expected from the shape of the road, that is, in a case where deviation occurs, it is possible to prompt the map server to update the high-precision map more quickly.

Thus, according to the above aspects, it is possible to provide a map information system that includes at least one vehicle and a map server configured to communicate with the vehicle and store a high-precision map, and can acquire information on a branching route and update the high-precision map when the branching route is newly established.

DETAILED DESCRIPTION OF THE INVENTION

In the following, a map information system according to an embodiment of the present invention will be described with reference to the drawings.

The First Embodiment

Figure 1:
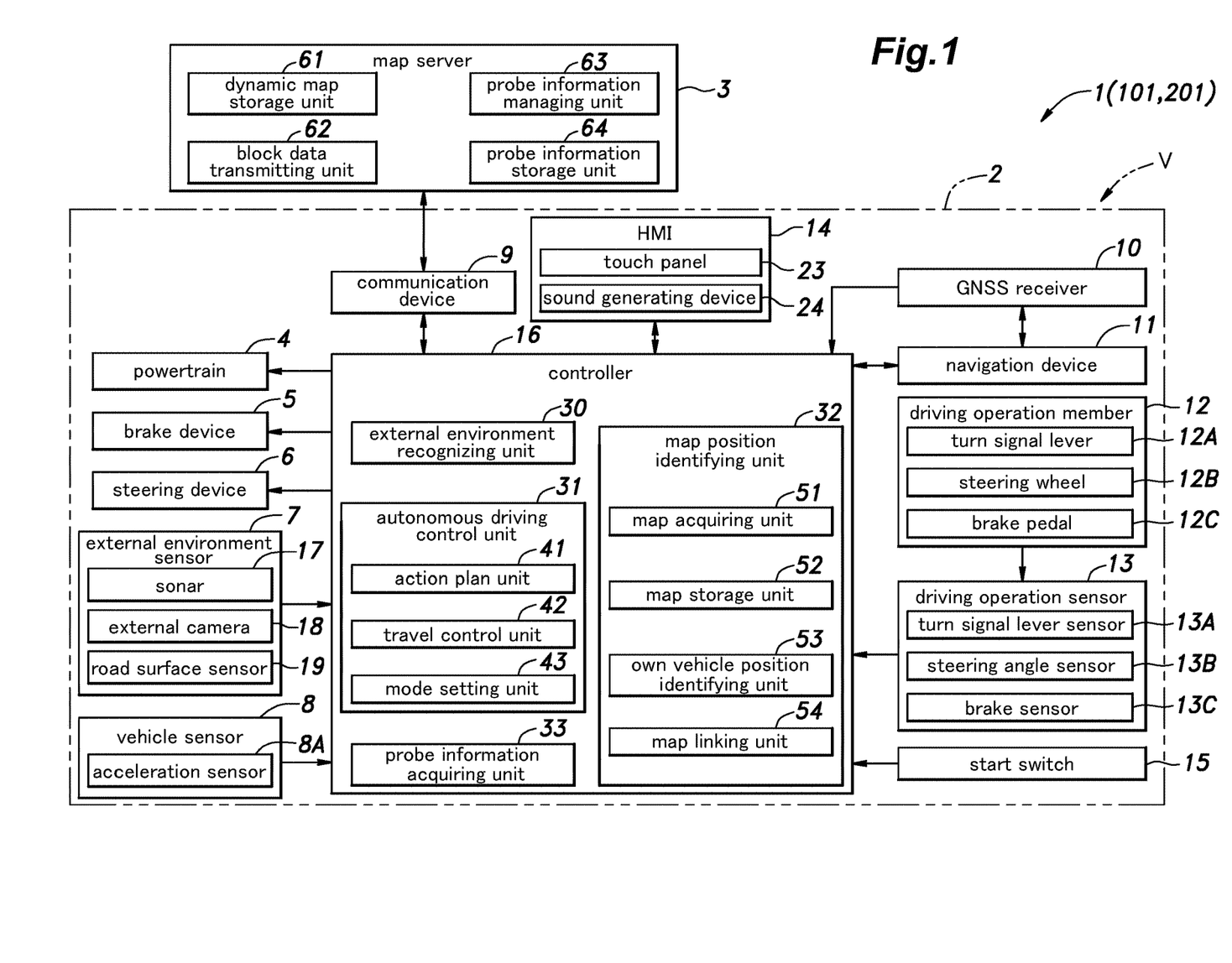
FIG. 1 is a functional block diagram showing the configuration of a map information system according to a first embodiment.

As shown in FIG. 1, the map information system 1 includes a vehicle system 2 mounted on a vehicle (see "V" in FIG. 1), and a map server 3 connected to the vehicle system 2 via a network.

<The Vehicle System>

First, the vehicle system 2 will be described. The vehicle system 2 includes a powertrain 4, a brake device 5, a steering device 6, an external environment sensor 7, a vehicle sensor 8, a communication device 9, a GNSS receiver 10, a navigation device 11, a driving operation member 12, a driving operation sensor 13, an HMI 14, a start switch 15, and a controller 16. Each component of the vehicle system 2 is connected to each other via a communication means such as Controller Area Network (CAN) such that signals can be transmitted therebetween.

The powertrain 4 is a device configured to apply a driving force to the vehicle. For example, the powertrain 4 includes at least one of an internal combustion engine (such as a gasoline engine and a diesel engine) and an electric motor. The brake device 5 is a device configured to apply a brake force to the vehicle. For example, the brake device 5 includes a brake caliper configured to press a pad against a brake rotor and an electric cylinder configured to supply an oil pressure to the brake caliper. The brake device 5 may further include a parking brake device configured to restrict rotation of wheels via wire cables. The steering device 6 is a device configured to change the steering angles of the wheels. For example, the steering device 6 includes a rack-and-pinion mechanism configured to steer the wheels and an electric motor configured to drive the rack-and-pinion mechanism. The powertrain 4, the brake device 5, and the steering device 6 are controlled by the controller 16.

The external environment sensor 7 is a sensor configured to detect an object outside the vehicle or the like by capturing electromagnetic waves, sound waves, or the like from the surroundings of the vehicle. The external environment sensor 7 includes a plurality of sonars 17 and a plurality of external cameras 18. The external environment sensor 7 may further include a millimeter wave radar and/or a laser lidar. The external environment sensor 7 is configured to output a detection result to the controller 16.

Each sonar 17 consists of a so-called ultrasonic sensor. The sonar 17 emits ultrasonic waves to the surroundings of the vehicle and captures the reflected waves therefrom, thereby detecting a position (distance and direction) of the object. The plurality of sonars 17 are provided at a rear part and a front part of the vehicle, respectively.

Each external camera 18 is a device configured to capture an image of the surroundings of the vehicle. For example, the external camera 18 is a digital camera that uses a solid imaging element such as a CCD and a CMOS. The external camera 18 may consist of a stereo camera or a monocular camera. The plurality of external cameras 18 include a front camera configured to capture an image in front of the vehicle, a rear camera configured to capture an image behind the vehicle, and a pair of side cameras configured to capture images on both lateral sides of the vehicle.

The vehicle sensor 8 is a sensor configured to detect the state of the vehicle. The vehicle sensor 8 includes a vehicle speed sensor configured to detect the speed of the vehicle, an acceleration sensor 8A configured to detect the front-and-rear acceleration and the lateral acceleration of the vehicle, a yaw rate sensor configured to detect the angular velocity around a yaw axis of the vehicle, a direction sensor configured to detect the direction of the vehicle, and the like. For example, the yaw rate sensor may consist of a gyro sensor. The vehicle sensor 8 may further include an inclination sensor configured to detect the inclination of a vehicle body and a wheel speed sensor configured to detect the rotational speed of each wheel.

In the present embodiment, the vehicle sensor 8 includes a 6-axis inertial measurement unit (IMU) configured to detect the front-and-rear acceleration, the lateral acceleration, the vertical acceleration, the roll rate (the angular velocity around a roll axis), the pitch rate (the angular velocity around a pitch axis), and the yaw rate (the angular velocity around a yaw axis).

The communication device 9 is configured to mediate communication between the controller 16 and a device (for example, the map server 3) outside the vehicle. The communication device 9 includes a router configured to connect the controller 16 to the Internet. The communication device 9 may have a wireless communication function of mediating wireless communication between the controller 16 (namely, the controller 16 of the own vehicle) and the controller of the surrounding vehicle and between the controller 16 and a roadside device on a road.

The GNSS receiver 10 (the own vehicle position identifying device) is configured to receive a signal (hereinafter referred to as "the GNSS signal") from each of positioning satellites that constitute a Global Navigation Satellite System (GNSS). The GNSS receiver 10 is configured to output the received GNSS signal to the navigation device 11 and the controller 16.

The navigation device 11 consists of a computer provided with known hardware. The navigation device 11 is configured to identify the current position (latitude and longitude) of the vehicle based on the previous travel history of the vehicle and the GNSS signal outputted from the GNSS receiver 10. The navigation device 11 is configured to store data (hereinafter referred to as "the navigation map data") on roads of a region or a country on which the vehicle is traveling. The navigation device 11 is configured to store the navigation map data in a RAM, an HDD, an SSD, or the like.

The navigation device 11 is configured to set, based on the GNSS signal and the navigation map data, a route from a current position of the vehicle to a destination input by an occupant, and output the route to the controller 16. When the vehicle starts traveling, the navigation device 11 provides the occupant with route guidance to the destination.

Figure 2A:
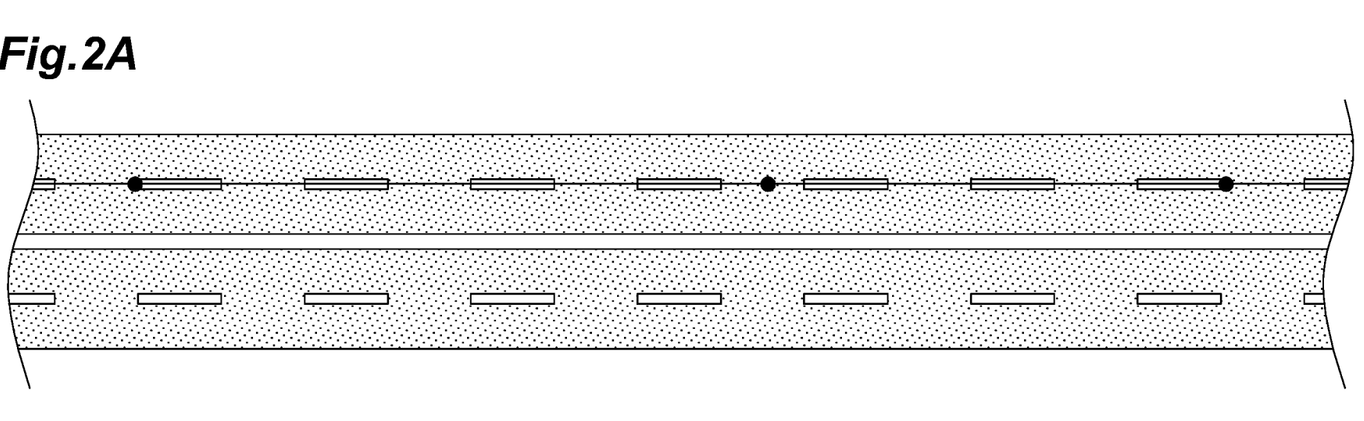
FIG. 2A is an explanatory diagram for explaining a map stored in a navigation device.

As shown in FIG. 2A, the navigation device 11 is configured to store, as information on roads on a map, information on points (nodes: see black circles in FIG. 2A) arranged on each road and line segments (links) connecting the nodes.

For example, each node stored in the navigation device 11 may be provided at a characteristic point such as an intersection or a merging point. The navigation device 11 is configured to store each link in association with a distance between the nodes connected by the link. The navigation device 11 is configured to acquire an appropriate route from the current position of the vehicle to the destination based on the distances between the nodes, and output information indicating the route to the controller 16. The outputted information indicating the route includes the points (nodes) on the road corresponding to the route and the links corresponding to vectors connecting the nodes.

The driving operation member 12 is provided in a vehicle cabin and configured to accept an input operation the occupant performs to control the vehicle. The driving operation member 12 includes a turn signal lever 12A, a steering wheel 12B, an accelerator pedal, and a brake pedal 12C. The driving operation member 12 may further include a shift lever, a parking brake lever, and the like.

The driving operation sensor 13 is a sensor configured to detect an operation amount of the driving operation member 12. The driving operation sensor 13 includes a turn signal lever sensor 13A configured to detect an input operation on the turn signal lever 12A by the occupant, a steering angle sensor 13B configured to detect an operation amount of the steering wheel 12B, an accelerator sensor configured to detect an operation amount of the accelerator pedal, and a brake sensor 13C configured to detect an operation amount of the brake pedal 12C. The driving operation sensor 13 is configured to output the detected operation amount to the controller 16. The turn signal lever sensor 13A is configured to detect the operation input (input operation) to the turn signal lever 12A and an indicating direction corresponding to the operation input. The driving operation sensor 13 may further include a grip sensor configured to detect that the occupant grips the steering wheel 12B. For example, the grip sensor consists of at least one capacitive sensor provided on an outer circumferential portion of the steering wheel 12B.

The HMI 14 is configured to notify the occupant of various kinds of information by display and/or voice, and accept an input operation by the occupant. For example, the HMI 14 includes a touch panel 23 and a sound generating device 24. The touch panel 23 includes a liquid crystal display, an organic EL display, or the like, and is configured to accept the input operation by the occupant. The sound generating device 24 consists of a buzzer and/or a speaker. The HMI 14 is configured to display a driving mode switch button on the touch panel 23. The driving mode switch button is a button configured to accept a switching operation of a driving mode (for example, an autonomous driving mode and a manual driving mode) of the vehicle by the occupant.

The HMI 14 also functions as an interface to mediate the input to/the output from the navigation device 11. Namely, when the HMI 14 accepts the input operation of the destination by the occupant, the navigation device 11 starts a route setting to the destination. Further, when the navigation device 11 provides the route guidance to the destination, the HMI 14 displays the current position of the vehicle and the route to the destination.

The start switch 15 is a switch for starting the vehicle system 2. Namely, the occupant presses the start switch 15 while sitting on the driver's seat and pressing the brake pedal 12C, and thus the vehicle system 2 is started.

The controller 16 consists of at least one electronic control unit (ECU) including a CPU, a ROM, a RAM, and the like. The CPU executes operation processing according to a program, and thus the controller 16 executes various types of vehicle control. The controller 16 may consist of one piece of hardware, or may consist of a unit including plural pieces of hardware. The functions of the controller 16 may be at least partially executed by hardware such as an LSI, an ASIC, and an FPGA, or may be executed by a combination of software and hardware.

<The Controller>

As shown in FIG. 1, the controller 16 includes an external environment recognizing unit 30, an autonomous driving control unit 31 (ADAS: Advanced Driver-Assistance Systems), a map position identifying unit 32 (MPU: Map Positioning Unit), and a probe information acquiring unit 33. These components may be composed of separate electronic control units and connected to each other via a gateway (central gateway: CGW). Alternatively, these components may be composed of an integrated electronic control unit.

The external environment recognizing unit 30 is configured to recognize an object that is present in the surroundings of the vehicle based on the detection result of the external environment sensor 7, and thus acquire information on the position and size of the object. The object recognized by the external environment recognizing unit 30 includes delimiting lines, lanes, road ends, road shoulders, and obstacles, which are present on the travel route of the vehicle.

Each delimiting line is a line shown along a vehicle travel direction. Each lane is an area delimited by one or more delimiting lines. Each road end is an end of the road. Each road shoulder is an area between the delimiting line arranged at an end in the vehicle width direction and the road end. For example, each obstacle may be a barrier (guardrail), a utility pole, a surrounding vehicle, a pedestrian, or the like.

The external environment recognizing unit 30 is configured to recognize the position of the object around the vehicle with respect to the vehicle by analyzing the image captured by each external camera 18. For example, the external environment recognizing unit 30 may recognize the distance and direction from the vehicle to the object in a top view around the vehicle body by using a known method such as a triangulation method or a motion stereo method. Further, the external environment recognizing unit 30 is configured to analyze the image captured by the external camera 18, and determine the type (for example, the delimiting line, the lane, the road end, the road shoulder, the obstacle, or the like) of each object based on a known method.

The autonomous driving control unit 31 includes an action plan unit 41, a travel control unit 42, and a mode setting unit 43.

The action plan unit 41 is configured to create an action plan for causing the vehicle to travel. The action plan unit 41 is configured to output a travel control signal corresponding to the created action plan to the travel control unit 42.

The travel control unit 42 is configured to control the powertrain 4, the brake device 5, and the steering device 6 based on the travel control signal from the action plan unit 41. Namely, the travel control unit 42 is configured to cause the vehicle to travel according to the action plan created by the action plan unit 41.

The mode setting unit 43 is configured to switch the driving mode of the vehicle between the manual driving mode and the autonomous driving mode based on the input operation (switching operation) on the HMI 14. In the manual driving mode, the travel control unit 42 controls the powertrain 4, the brake device 5, and the steering device 6 in response to the input operation on the driving operation member 12 (for example, the steering wheel 12B, the accelerator pedal and/or the brake pedal 12C) by the occupant, thereby causing the vehicle to travel. On the other hand, in the autonomous driving mode, the occupant does not need to perform the input operation on the driving operation member 12, and the travel control unit 42 controls the powertrain 4, the brake device 5, and the steering device 6, thereby causing the vehicle to travel autonomously. Namely, a driving automation level of the autonomous driving mode is higher than that of the manual driving mode.

The map position identifying unit 32 includes a map acquiring unit 51, a map storage unit 52, an own vehicle position identifying unit 53, and a map linking unit 54.

The map acquiring unit 51 is configured to access the map server 3 and acquire dynamic map data, which is high-precision map information, from the map server 3. For example, as the navigation device 11 sets the route, the map acquiring unit 51 acquires the latest dynamic map data of an area corresponding to the route from the map server 3 via the communication device 9.

The dynamic map data is more detailed than the navigation map data stored in the navigation device 11, and includes static information, semi-static information, semi-dynamic information, and dynamic information. The static information includes 3D map data that is more precise than the navigation map data. The semi-static information includes traffic regulation information, road construction information, and wide area weather information. The semi-dynamic information includes accident information, traffic congestion information, and small area weather information. The dynamic information includes signal information, surrounding vehicle information, and pedestrian information.

Figure 2B:
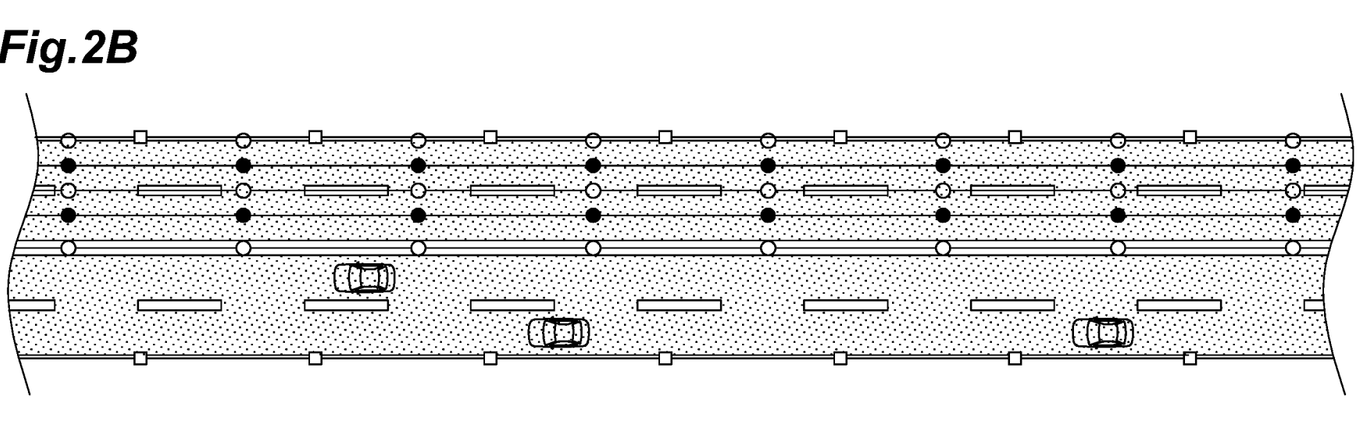
FIG. 2B is an explanatory diagram for explaining data of a high-precision map.

As shown in FIG. 2B, the static information (the high-precision map) of the dynamic map data includes information on the lanes (for example, the number of lanes) on the travel route and information on each delimiting line (for example, the type of the delimiting line) on the travel route. For example, the delimiting line of the static information is expressed as nodes (see white circles in FIG. 2B) arranged at smaller intervals than the nodes of the navigation map data and links connecting the nodes.

Further, each roadway of the static information is also expressed as nodes (hereinafter referred to as "the roadway nodes": see black circles in FIG. 2B) arranged at prescribed intervals and links (hereinafter referred to as "the roadway links") connecting the nodes (the roadway nodes). Each roadway node is provided at the halfway point between each node of the delimiting line set on a left edge of the road and each node of the delimiting line set on a right edge of the road. The roadway nodes are provided at prescribed intervals along the road.

The high-precision map (the static information) further includes information on road shoulder edges. Each road shoulder edge is an end of the roadway on which the vehicle travels. When the roadway and a sidewalk are provided, the road shoulder edge means a boundary therebetween. The road shoulder edge of the static information is expressed as nodes (see white squares in FIG. 2B: hereinafter referred to as "the road shoulder edge nodes") arranged along the road shoulder edge at approximately the same intervals as the nodes of the delimiting line and links (hereinafter referred to as "the road shoulder edge links") connecting the nodes (the road shoulder nodes).

The map storage unit 52 includes a storage unit such as an HDD and an SSD. The map storage unit 52 is configured to store various kinds of information for causing the vehicle to travel autonomously in the autonomous driving mode. The map storage unit 52 is configured to store the dynamic map data acquired by the map acquiring unit 51 from the map server 3.

The own vehicle position identifying unit 53 is configured to identify the position (latitude and longitude) of the vehicle, namely the own vehicle position based on the GNSS signal received by the GNSS receiver 10.

The own vehicle position identifying unit 53 is configured to calculate a movement amount (a movement distance and a movement direction: hereinafter referred to as "the DR movement amount") of the vehicle by using dead reckoning (for example, odometry) based on a detection result of the vehicle sensor 8 (IMU or the like). For example, the own vehicle position identifying unit 53 is configured to identify the own vehicle position based on the DR movement amount when the GNSS signal cannot be received. Further, the own vehicle position identifying unit 53 may execute a process for improving the identification accuracy of the own vehicle position by correcting, based on the DR movement amount, the own vehicle position identified from the GNSS signal.

The map linking unit 54 is configured to extract, based on the route output from the navigation device 11, a corresponding route on the high-precision map stored in the map storage unit 52.

When the vehicle is given an instruction to start traveling autonomously, the action plan unit 41 creates a global action plan (for example, a lane change, merging, branching, or the like) based on the route extracted by the map linking unit 54. After that, when the vehicle starts traveling autonomously, the action plan unit 41 creates a more detailed action plan (for example, an action plan for avoiding danger or the like) based on the global action plan, the own vehicle position identified by the own vehicle position identifying unit 53, the object recognized by the external environment recognizing unit 30, the high-precision map stored in the map storage unit 52, or the like. The travel control unit 42 controls the travel of the vehicle based on the created detailed action plan.

The probe information acquiring unit 33 associates the own vehicle position, which is identified by the own vehicle position identifying unit 53 based on the GNSS signal, with the data detected by at least one of the external environment sensor 7, the vehicle sensor 8, and the driving operation sensor 13, thereby acquiring and storing the own vehicle position and the data as probe information.

More specifically, when the turn signal lever sensor 13A detects the operation input to the turn signal lever 12A, the probe information acquiring unit 33 associates the own vehicle position (latitude and longitude), which is identified based on the GNSS signal when the operation input is detected by the turn signal lever sensor 13A, with the travel direction of the vehicle corresponding to the operation input to the turn signal lever 12A, thereby acquiring and storing the own vehicle position and the travel direction of the vehicle as the probe information.

In the present embodiment, when the turn signal lever sensor 13A detects the operation input (hereinafter referred to as "the turn signal operation") to the turn signal lever 12A, the probe information acquiring unit 33 acquires and stores the position (latitude and longitude) of the vehicle when the turn signal operation is performed, the indicating direction (namely the travel direction of the vehicle) corresponding to the turn signal operation, and the history (hereinafter referred to as "the travel history") of the own vehicle position within a prescribed period of the detection of the turn signal operation, which is identified based on the GNSS signal. In the present embodiment, the travel history is represented by a group of points, which indicate the position of the vehicle per unit time within the prescribed period of the detection of the turn signal operation. At the same time, the probe information acquiring unit 33 acquires and stores information on the surroundings of the vehicle (in the present embodiment, a video in which an image in front of the vehicle is captured by the external cameras 18) detected by the external environment sensor 7.

Hereinafter, the position where the turn signal operation is performed, the travel history of the vehicle after the turn signal operation, the indicating direction (the travel direction of the vehicle) corresponding to the turn signal operation, and the information on the surroundings of the vehicle acquired (detected) by the external environment sensor 7 (external cameras 18) after the corresponding turn signal operation will be referred to as "the turn signal information".

The probe information acquiring unit 33 appropriately transmits the acquired probe information to the map server 3.

<The Map Server>

Next, the map server 3 will be described. As shown in FIG. 1, the map server 3 is connected to the controller 16 via the network (in the present embodiment, the Internet). The map server 3 is a computer including a CPU, a ROM, a RAM, and a storage unit such as an HDD and an SSD.

The dynamic map data is stored in the storage unit of the map server 3. The dynamic map data stored in the storage unit of the map server 3 covers a wider area than the dynamic map data stored in the map storage unit 52 of the controller 16. The dynamic map data includes a plurality of block data (partial map data) corresponding to each area on the map. Preferably, each of the block data corresponds to a rectangular area on the map divided in the latitude direction and the longitude direction.

Upon receiving a request for data from the controller 16 (the map acquiring unit 51) via the communication device 9, the map server 3 transmits the dynamic map (the dynamic map data) corresponding to the requested data to the corresponding controller 16. The transmitted data (the dynamic map data) may include the traffic congestion information, the weather information, and the like.

As shown in FIG. 1, the map server 3 includes a dynamic map storage unit 61, a block data transmitting unit 62, a probe information managing unit 63, and a probe information storage unit 64.

The dynamic map storage unit 61 consists of a storage unit, and is configured to store a dynamic map in an area wider than an area in which the vehicle travels. The block data transmitting unit 62 is configured to accept a transmission request for specific block data from the vehicle, and transmit the block data corresponding to the transmission request to the vehicle.

The probe information managing unit 63 is configured to receive the probe information appropriately transmitted from the vehicle. The probe information storage unit 64 is configured to store (hold) the probe information acquired (received) by the probe information managing unit 63. The probe information managing unit 63 appropriately executes statistical processing and the like based on the probe information stored in the probe information storage unit 64, thereby executing an updating process for updating the dynamic map.

Figure 3:
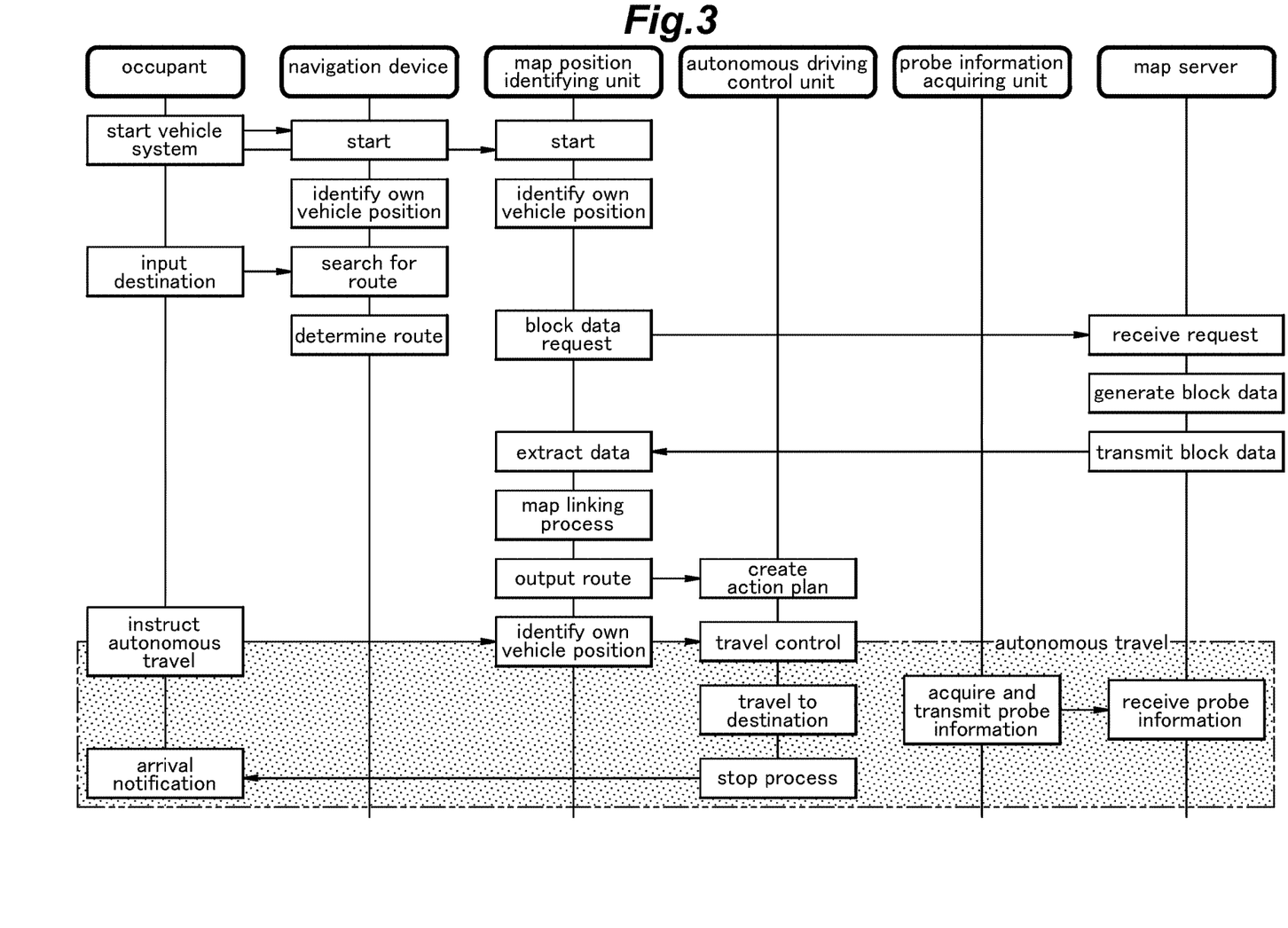
FIG. 3 is a sequence diagram for explaining the operation executed by the map information system in a case where a vehicle travels autonomously.

Next, the operation of the vehicle system 2 will be described. The vehicle system 2 is started as the occupant boards the vehicle and presses the start switch 15 while pressing the brake pedal 12C. After that, as the occupant inputs the destination and makes an input to start autonomous travel to the HMI 14, the vehicle travels autonomously and arrives at the destination. FIG. 3 shows a sequence diagram from the start of the vehicle to the arrival at the destination. Hereinafter, the outline of the processing (operation) executed by the autonomous driving control unit 31, the map position identifying unit 32, the probe information acquiring unit 33, and the map server 3 when the vehicle travels autonomously and arrives at the destination will be described with reference to FIG. 3.

When the start switch 15 is pressed and the vehicle system 2 starts, the navigation device 11 and the map position identifying unit 32 each identify the own vehicle position based on the GNSS signal from the satellites.

After that, when the occupant inputs the destination to the HMI 14, the navigation device 11 searches for and determines the route from the current position to the destination based on the navigation map data.

After determining the route, the navigation device 11 outputs the determined route to the map position identifying unit 32. The map position identifying unit 32 requests the map server 3 to transmit the corresponding block data based on the acquired route.

Upon receiving the request (block data request) from the map position identifying unit 32, the map server 3 generates the corresponding block data based on the route set (determined) by the navigation device 11 and the position of the vehicle, and transmits the generated block data to the map position identifying unit 32 (the vehicle system 2).

Upon receiving the block data, the map position identifying unit 32 acquires (extracts) the data relating to the dynamic map around the vehicle from the block data. After that, the map position identifying unit 32 (the map linking unit 54) executes a map linking process and outputs, to the autonomous driving control unit 31, the route on the high-precision map corresponding to the route in the block data from the departure point to the destination set (determined) by the navigation device 11. After that, the autonomous driving control unit 31 (the action plan unit 41) creates the global action plan according to the route on the high-precision map.

When an input to instruct the vehicle to travel autonomously is made on the HMI 14, the map position identifying unit 32 identifies the own vehicle position, and the autonomous driving control unit 31 sequentially creates the more detailed action plan based on the identified own vehicle position, the position of the object recognized by the external environment recognizing unit 30, and the like. The autonomous driving control unit 31 (the travel control unit 42) controls the vehicle according to the created action plan, thereby causing the vehicle to travel autonomously.

When the vehicle starts traveling, the probe information acquiring unit 33 starts acquiring the probe information. While the vehicle is traveling, the probe information acquiring unit 33 appropriately transmits the acquired probe information to the map server 3 as the probe information during autonomous driving. Upon receiving the probe information during autonomous driving, the map server 3 stores (holds) the received probe information as the probe information during autonomous driving, and appropriately updates the dynamic map based on the probe information during autonomous driving.

When the vehicle arrives at the destination, the autonomous driving control unit 31 executes a stop process for stopping the vehicle, and the HMI 14 displays a notification that the vehicle arrives at the destination.

Figure 4:
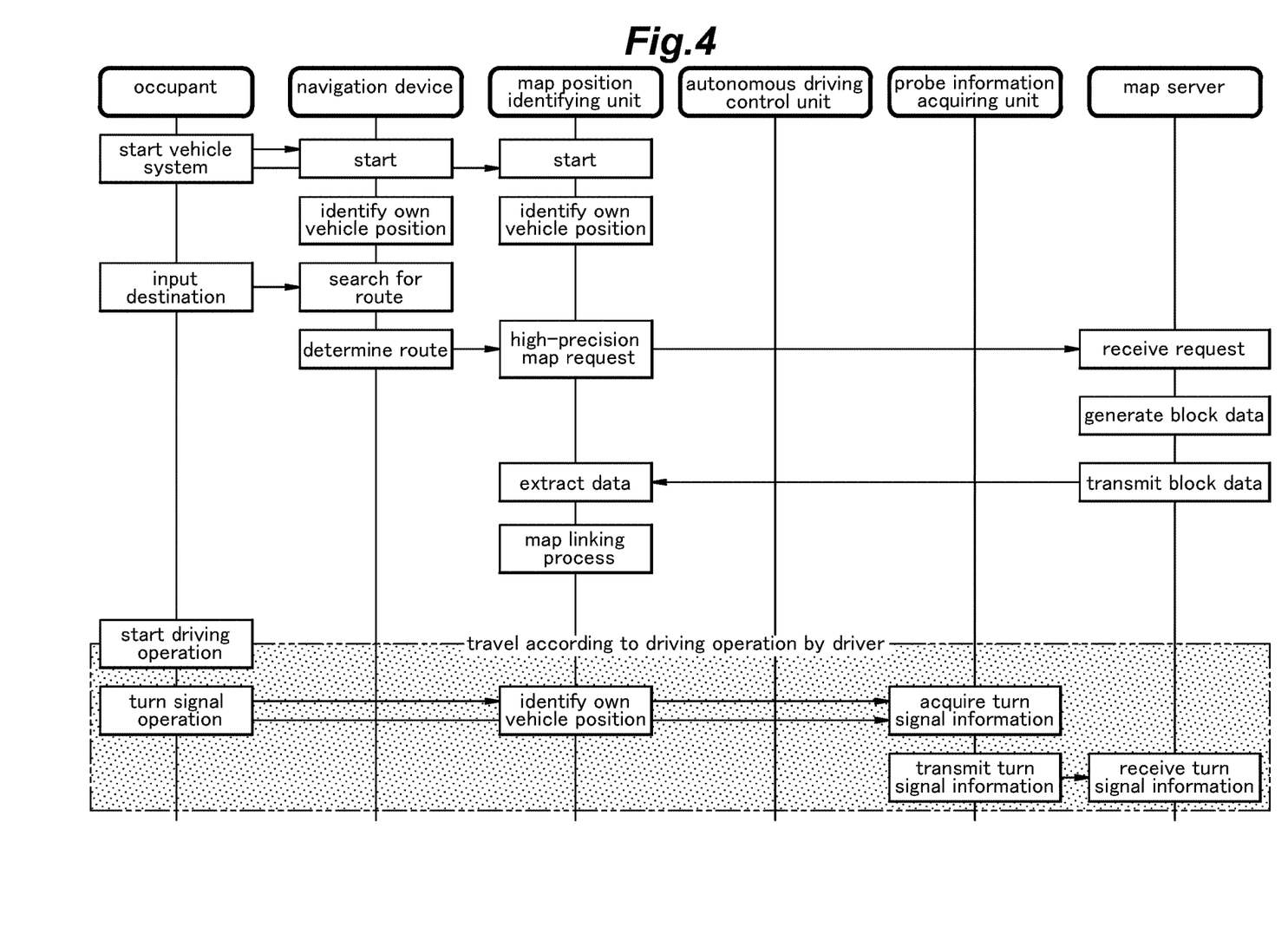
FIG. 4 is a sequence diagram for explaining the operation executed by the map information system in a case where the vehicle travels according to a driving operation by a driver.

As shown in FIG. 4, when the driver makes an input to perform (start) the driving operation to the HMI 14 after the vehicle system 2 is started, the vehicle travels according to the driving operation by the driver.

When the vehicle travels according to the driving operation by the driver, processing similar to the above is executed. That is, when the destination is input to the navigation device 11, the map position identifying unit 32 receives the corresponding block data from the map server 3 based on the acquired route, and acquires the data relating to the dynamic map. When the vehicle starts traveling according to the driving operation by the driver, the probe information acquiring unit 33 starts acquiring the probe information. While the vehicle is traveling, the probe information acquiring unit 33 appropriately transmits the acquired probe information to the map server 3 as the probe information during manual driving.

For example, when the driver performs the turn signal operation on the turn signal lever 12A, the turn signal lever sensor 13A detects the operation input thereof. When the operation input is detected by the turn signal lever sensor 13A, the probe information acquiring unit 33 acquires the turn signal information, and transmits the turn signal information to the map server 3 as the probe information.

Upon acquiring the probe information during manual driving, the map server 3 stores (holds) the acquired probe information as the probe information during manual driving, and appropriately executes the updating process based on the probe information during manual driving, thereby updating the dynamic map.

In this way, the map server 3 updates the high-precision map based on the probe information from the vehicle. That is, the map information system 1, which updates the high-precision map based on the probe information from the vehicle, is composed of the vehicle and the map server 3 storing the high-precision map and configured to communicate with the vehicle.

Next, the updating process executed by the map server 3 (more specifically, the probe information managing unit 63) in the map information system 1 will be described. The updating process is a process for updating the high-precision map (dynamic map) based on the probe information during manual driving.

The updating process includes, for example, a process for increasing the branching route that is not present on the high-precision map, a process for deleting the travel lane on the high-precision map, a process for adding and updating road surface information to the high-precision map, and the like. For example, the process for increasing the branching route that is not present on the high-precision map is executed when the branching route is added to an expressway or the like by construction or the like. For example, the process for deleting the travel lane is executed when a part of the travel lanes of an expressway or the like is deleted by construction or the like. For example, the process for adding the road surface information to the high-precision map is executed to acquire an index, add the index to the dynamic map data, and reflect the index in behavior control of the vehicle that travels autonomously. For example, the above index includes an index (for example, the friction coefficient or the like) for the vehicle sensor 8 to indicate the quality of the road surface based on vehicle behavior, an index indicating the difference between the vehicle speed estimated from the shape of the road and the actual vehicle speed, an index indicating the difference between the steering angle estimated from the shape of the road and the actual steering angle, or the like.

Figure 5:
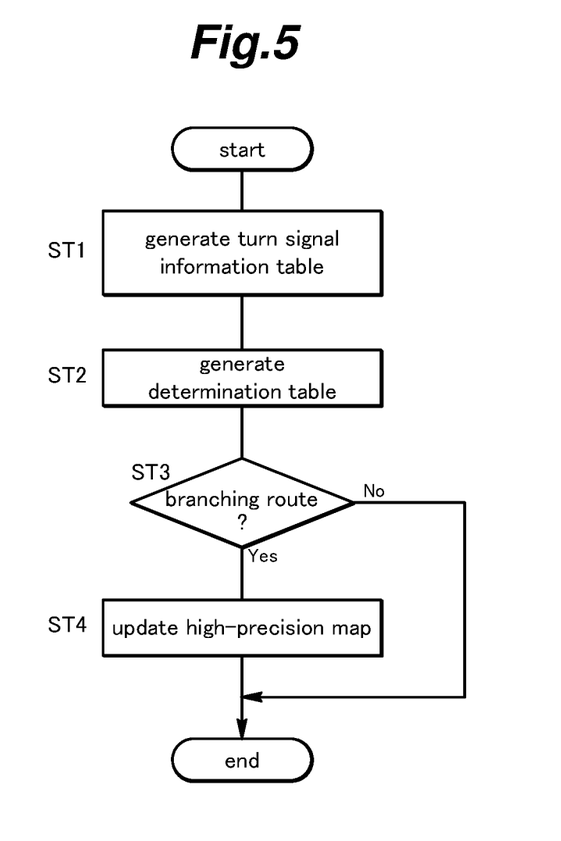
FIG. 5 is a flowchart of a branching route adding process.

Hereinafter, the details of a branching route adding process will be described with reference to FIG. 5. In the branching route adding process, the probe information managing unit 63 adds the branching route to the high-precision map based on plural pieces of probe information transmitted from the vehicles traveling on an expressway or the like to the map server 3 and stored in the probe information storage unit 64.

In the first step ST1 of the branching route adding process, the probe information managing unit 63 acquires plural pieces of probe information acquired after the turn signal operation, namely plural pieces of turn signal information from the probe information transmitted from a plurality of vehicles. Each piece of the turn signal information includes the position (latitude and longitude) where the turn signal operation has been performed, the travel history of the vehicle after the turn signal operation, the indicating direction (namely, the travel direction of the vehicle) corresponding to the turn signal operation, and the information on the surroundings of the vehicle acquired by the external environment sensor 7 after the turn signal operation.

After that, the probe information managing unit 63 generates a set of data in which an ID (hereinafter referred to as "the turn signal ID") is added to each piece of the turn signal information, and writes the set of data to a turn signal information table T1 stored in the probe information storage unit 64 so as to the generate turn signal information table T1. When this writing is completed, the probe information managing unit 63 executes step ST2.

In step ST2, the probe information managing unit 63 determines, with respect to each piece of the turn signal information recorded in the turn signal information table T1, whether the travel history of the vehicle after the turn signal operation is present on the road recorded (stored) in the high-precision map. In the present embodiment, the probe information managing unit 63 may determine whether the travel history of the vehicle after the turn signal operation is present on the road recorded in the high-precision map by determining whether a point group indicating the travel history of the vehicle after the turn signal operation is present between the road shoulder edge links recorded in the high-precision map. After that, the probe information managing unit 63 extracts, from the turn signal information table T1, only a set of data in which the travel history of the vehicle after the turn signal operation is not present on the road recorded in the high-precision map, and records the set of data in a determination table T2 so as to generate the determination table T2. When generation of the determination table T2 (recording of the set of data) is completed, the probe information managing unit 63 executes step ST3.

In step ST3, the probe information managing unit 63 determines whether an added branching route is present based on the travel histories of a plurality of vehicles after the turn signal operation recorded in the determination table T2. More specifically, the probe information managing unit 63 executes statistical processing on the travel histories of the vehicles after the turn signal operation, and determines whether the travel histories of the vehicles after the turn signal operation are consistent with each other. In a case where many vehicles have similar travel histories and thus the travel histories of the vehicles after the turn signal operation are consistent with each other, the probe information managing unit 63 determines that the added branching route is present (determines that the high-precision map needs to be updated).

In the present embodiment, the probe information managing unit 63 plots, on the map, the points indicating the travel histories of the vehicles recorded in the determination table T2, divides the map into grid areas, and calculates the density of the points in each grid area. In a case where there is an area in the map where the density of the points indicating the travel histories is equal to or more than a prescribed value, the probe information managing unit 63 estimates that the travel histories of the vehicles after the turn signal operation are consistent with each other, and thus determines that the added branching route is present. The probe information managing unit 63 (the map server 3) executes step ST4 upon determining that the added branching route is present, while ends the branching route adding process upon determining that the added branching route is not present.

In step ST4, the probe information managing unit 63 extracts the information on the surroundings of the vehicle estimated to have traveled on the added branching route based on the travel histories of the vehicles after the turn signal operation recorded in the determination table T2. More specifically, in a case where any of the points indicating the travel history of the vehicle is present in an area on the map where the density of the points indicating the travel histories is equal to or more than the prescribed value, the probe information managing unit 63 determines that the above vehicle has traveled on the added branching route, and acquires the corresponding information on the surroundings as the information on the surroundings of the vehicle that has traveled on the branching route. After that, the probe information managing unit 63 acquires, based on the information on the surroundings of the vehicle that has traveled on the branching route, the road information including information on the road ends, the shape, the centerline, or the like of the road on which the vehicle has traveled after the turn signal operation. Upon acquiring the road information, the probe information managing unit 63 adds information on the lanes, the delimiting lines, or the like of the branching route to the high-precision map based on the acquired road information, thereby updating the high-precision map. When the update of the high-precision map is completed, the probe information managing unit 63 completes the branching route adding process.

Next, the operation of the map information system 1 configured in this way will be described.

Figure 6A:
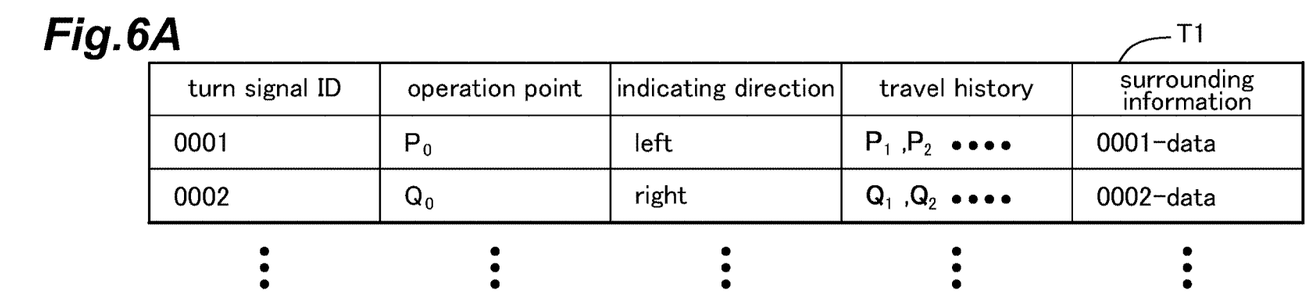
FIG. 6A is an example of a turn signal information table.

The probe information managing unit 63 extracts data indicating that the turn signal operation has been performed from the probe information, and generates the turn signal information table T1 (step ST1). As shown in FIG. 6A, the turn signal ID, the position (the operation point) where the turn signal operation has been performed, the travel direction (the indicating direction) of the vehicle corresponding to the turn signal operation, the travel history of the vehicle after the turn signal operation, and the information (the surrounding information) on the surroundings of the vehicle acquired by the external environment sensor 7 after the corresponding turn signal operation are recorded in the turn signal information table T1.

In the present embodiment, the information on the surroundings of the vehicle is recorded as a video captured by the external cameras 18 (imaging device) that acquire the image in front of the vehicle. As shown in FIG. 6A, a file name indicating the captured video is written in the turn signal information table T1.

In step ST2, the probe information managing unit 63 determines whether the travel history of the vehicle after the turn signal operation is present on the road recorded in the high-precision map by determining whether all the points, which are included in the point groups indicating the travel history of the vehicle after the turn signal operation, are present between the road shoulder edge links recorded in the high-precision map.

Figure 6B:
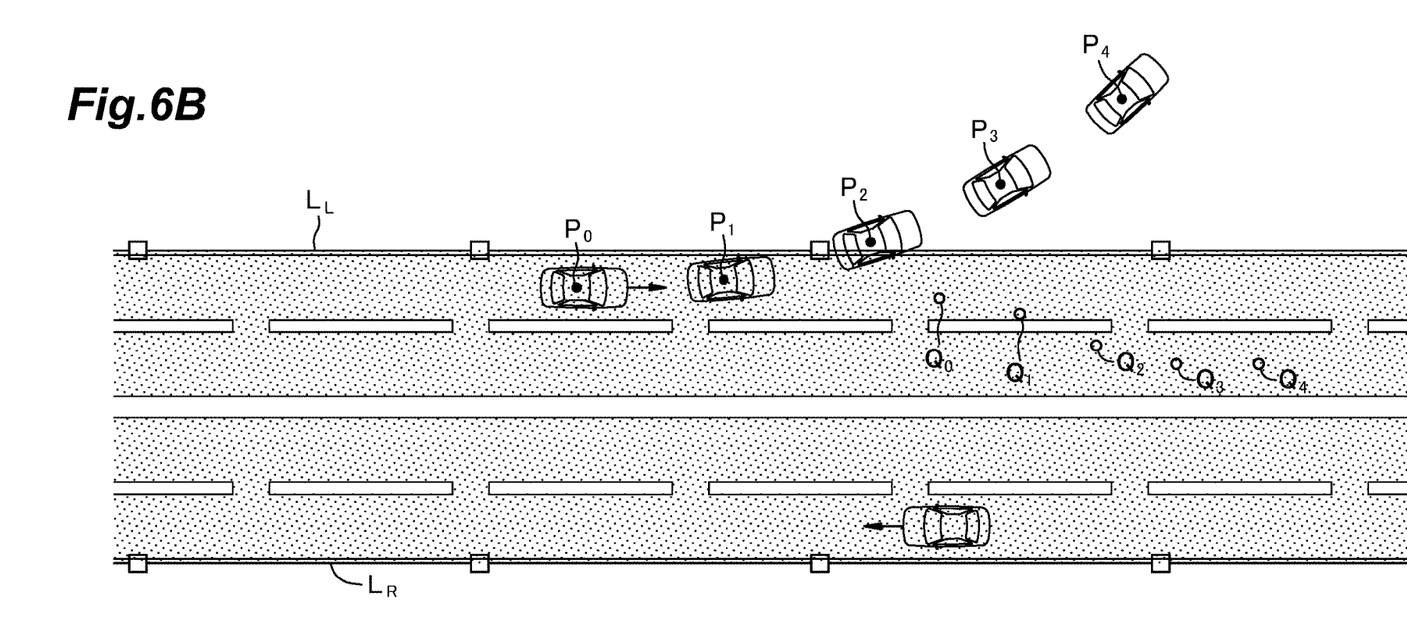
FIG. 6B is a schematic diagram showing travel histories of vehicles.
Figure 7A:
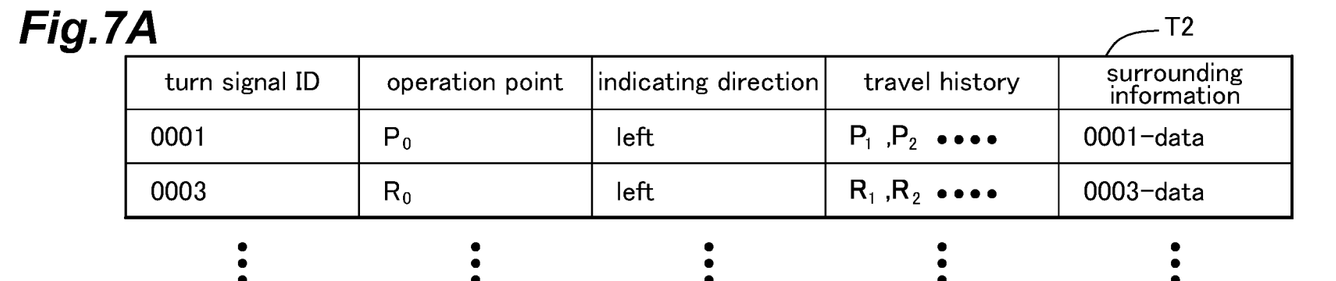
FIG. 7A is an example of a determination table.

For example, in FIG. 6B, points $P_2$ to $P_4$, which are included in the point groups $P_1$ to $P_4$ indicating the travel history of the vehicle after the turn signal operation, are not present between the road shoulder edge links $L_L$ and $L_R$. Accordingly, the probe information managing unit 63 determines that the travel history with the turn signal ID "0001" is not present on the road recorded on the high-precision map, and records the turn signal information with the turn signal ID "0001" in the determination table T2 (step ST2: see FIG. 7A).

Figure 7B:
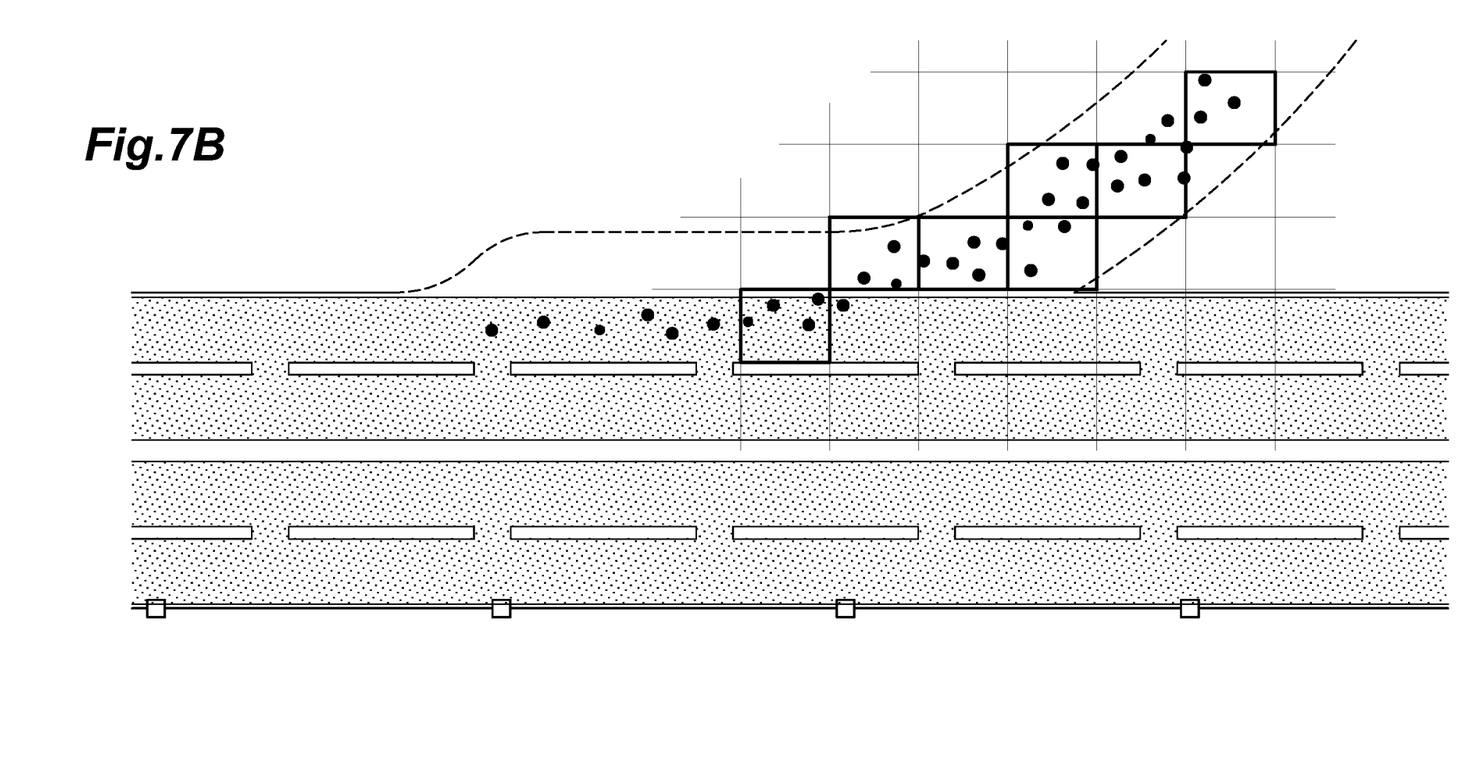
FIG. 7B is a schematic diagram for explaining a map on which points indicating the travel histories are plotted.

Next, as shown in FIG. 7B, the probe information managing unit 63 plots, on the map, the points indicating the travel histories of the vehicles recorded in the determination table T2.

When the branching route is added, the travel histories of the vehicles traveling on the branching route run along the branching route, and are consistent with each other. Accordingly, as shown in FIG. 7B, many points indicating the travel histories of the vehicles are present in an area along the branching route (see broken lines in FIG. 7B), and thus the density of the points in the area along the branching route increases (see the area surrounded by thick lines in FIG. 7B).

The probe information managing unit 63 divides the map on which the points indicating the travel histories of the vehicles are plotted into the grid areas, and determines whether there is a grid area where the density of the points is equal to or more than the prescribed value. Accordingly, the probe information managing unit 63 determines whether the travel histories of the vehicles after the turn signal operation are consistent with each other, and thus acquires the presence/absence of the added branching route (step ST3).

In a case where the added branching route is present, the probe information managing unit 63 acquires, based on the video (the image) captured by the external cameras 18, the road information (for example, road ends or the like: see the broken lines in FIG. 7B) relating to the road on which the vehicle has traveled after the turn signal operation from the turn signal information (probe information) including the travel histories in an area with high density of the points. The probe information managing unit 63 updates the high-precision map based on the road information.

Next, the effect of the map information system 1 configured in this way will be described.

The map server 3 may simply extract the data whose travel history is not present on the road on the high-precision map and update the high-precision map without extracting the data indicating that the turn signal operation has been performed by the occupant. However, if such an updating method is adopted, the high-precision map may be erroneously updated in a case where the own vehicle position cannot be properly identified.

On the other hand, in the present embodiment, the probe information managing unit 63 extracts, from the probe information, the data indicating that the turn signal operation has been performed by the occupant (step ST1), and further extracts the data whose travel history is not present on the road on the high-precision map from the extracted data, thereby updating the high-precision map (step ST4). Accordingly, the high-precision map can be updated based on the data in a case where the occupant has confirmed the presence of the road and performed the turn signal operation. Accordingly, it is possible to prevent the high-precision map from being updated erroneously, and thus more accurately determine the new establishment of the branching route, so that the accuracy of the high-precision map can be improved. Further, by extracting the probe information in a case where the turn signal operation has been performed, it is possible to detect the new establishment of the branching route more quickly. Accordingly, the updating speed of the high-precision map can be increased, so that the accuracy of the high-precision map can be improved.

Further, the probe information managing unit 63 determines whether the travel histories of the vehicles after the turn signal operation are consistent with each other by determining whether the density on the map is equal to or more than the prescribed threshold (prescribed value), and acquires the presence/absence of the added branching route (step ST3). In this way, the probe information managing unit 63 determines whether the high-precision map needs to be updated by determining whether the travel histories of the vehicles are consistent based on the probe information from a plurality of vehicles. Accordingly, it is possible to prevent the probe information managing unit 63 from updating the high-precision map based on incorrect information, so that the accuracy of the high-precision map can be improved.

The probe information managing unit 63 plots the points indicating the travel histories of the vehicles after the turn signal operation, and determines that the travel histories of the vehicles after the turn signal operation are consistent with each other when the density of the points is equal to or more than the prescribed threshold. In this way, by plotting the points indicating the travel histories on the map and using the density thereof, it is possible to easily determine whether the travel histories of the vehicles after the turn signal operation are consistent with each other, as compared with a case of comparing the travel histories of the probe information with each other.

Further, the road information is acquired and the high-precision map is updated based on the video (image) acquired by the external cameras 18 mounted on the vehicles traveling on the added branching route. Accordingly, it is not necessary to cause a vehicle for measurement to travel separately so as to update the high-precision map, so that information on the branching route to be added to the high-precision map can be acquired appropriately and easily.

The Second Embodiment

A map information system 101 according to the second embodiment differs from the map information system 1 according to the first embodiment in that the external environment sensor 7 includes a road surface sensor 19 configured to acquire information on the road surface (for example, the friction coefficient, presence/absence of a bump that is a bulging part on the road surface, or the like: hereinafter referred to as "the road surface information") and the map server 3 and the controller 16 execute processing based on the road surface information. With respect to other configurations, the second embodiment is substantially the same as the first embodiment, and thus the description of other configurations will be omitted.

The probe information acquiring unit 33 acquires, from the road surface sensor 19, the road surface information on the road surface on which the vehicle is traveling while the vehicle is traveling autonomously or according to the driving operation by the occupant (the driver). The controller 16 transmits, to the map server 3, the acquired road surface information and the corresponding position identified by the own vehicle position identifying unit 53 as the probe information.

The probe information storage unit 64 stores the road surface information received from the controller 16. The probe information managing unit 63 adds the road surface information stored in the probe information storage unit 64 to the high-precision map as an attribute of each lane link (a link of each lane). At this time, the probe information storage unit 64 may add plural pieces of the road surface information received from the controller 16 to the high-precision map after executing statistical processing on the plural pieces of the road surface information (for example, after acquiring an average or a mode). Further, when the road surface information has already been added to the high-precision map, the probe information storage unit 64 may appropriately update the added road surface information based on the acquired road surface information.

When the vehicle travels autonomously, the controller 16 executes the vehicle control based on the road surface information added as an attribute of each lane link. More specifically, upon determining based on the road surface information that the vehicle is traveling or will travel in an area where the friction coefficient of the road surface is small, the action plan unit 41 may cause the travel control unit 42 to control the vehicle so as to prevent a skid of the vehicle. Further, upon determining based on the road surface information that the vehicle is traveling or will travel on the road surface where a bump is present, the action plan unit 41 may cause the travel control unit 42 to control the vehicle so as to decelerate the vehicle. Further, the action plan unit 41 may appropriately select, based on the road surface information, a travel lane on which the vehicle should travel (for example, a recommended lane on which the travel of the vehicle is recommended).

Next, the effect of the map information system 101 according to the second embodiment will be described. When the vehicle travels autonomously, the controller 16 executes the vehicle control based on the road surface information added as an attribute of each lane link. Accordingly, the vehicle control can be executed based on the road surface information. Thus, it is possible to prevent a skid of the vehicle and decelerate the vehicle when the vehicle travels on the road surface where a bump is present, so that the safety and the comfort of the vehicle can be enhanced.

The Third Embodiment

The map information system 201 according to the third embodiment differs from the map information system 1 according to the first embodiment in that the probe information acquiring unit 33 acquires information on the vehicle state from the vehicle sensor 8 and information from the driving operation sensor 13 during manual driving, determines whether these pieces of information is consistent with the information on the high-precision map stored in the map storage unit 52, and transmits the probe information to the map server 3 when the former is inconsistent with the latter. Also, the map information system 201 according to the third embodiment differs from the map information system 1 according to the first embodiment in the processing of the map server 3 at the time when the corresponding probe information is acquired. With respect to other configurations, the third embodiment is substantially the same as the first embodiment, and thus the description of other configurations will be omitted.

During manual driving, the probe information acquiring unit 33 acquires the information on the vehicle state, namely information on the vehicle behavior from the vehicle sensor 8. More specifically, the probe information acquiring unit 33 acquires the front-and-rear acceleration and the lateral acceleration of the vehicle from the acceleration sensor 8A configured to detect the acceleration of the vehicle. Further, the probe information acquiring unit 33 acquires information from the driving operation sensor 13, more specifically the steering angle from the steering angle sensor 13B. Next, the probe information acquiring unit 33 extracts the shape of the road on which the vehicle is traveling from the high-precision map. After that, the probe information acquiring unit 33 determines whether the vehicle behavior deviates from the extracted shape of the road by determining whether any one of the front-and-rear acceleration, the lateral acceleration, and the steering angle of the vehicle is within a range estimated from the extracted shape of the road.

During manual driving, in a case where the road on which the vehicle is traveling is recorded as a straight road on the high-precision map and the steering angle acquired by the steering angle sensor 13B is equal to or more than a prescribed value while the vehicle is traveling, the probe information acquiring unit 33 determines that the vehicle behavior deviates from the shape of the road. Further, in a case where the curvature of the road on which the vehicle is traveling is equal to or more than a prescribed value and the front-and-rear acceleration is equal to or more than a prescribed value, the probe information acquiring unit 33 determines that the vehicle behavior deviates from the shape of the road.

When the vehicle behavior deviates from the extracted shape of the road, the probe information acquiring unit 33 transmits, to the map server 3, a flag signal notifying the deviation (inconsistency) and the information on the surroundings of the vehicle including the video of the image in front of the vehicle acquired by the external cameras 18 as the probe information.

The probe information storage unit 64 of the map server 3 stores the transmitted probe information. The probe information managing unit 63 preferentially extracts, from the probe information stored in the probe information storage unit 64, data including the flag signal indicating that the vehicle behavior deviates from the extracted shape of the road, and appropriately executes statistical processing based on the extracted data, thereby updating the high-precision map.

Next, the effect of the map information system 201 according to the third embodiment will be described. In a case where the acceleration and/or deceleration or the steering angle is not within the range estimated from the shape of the road, that is, in a case where deviation occurs, the flag signal indicating the deviation is transmitted. The probe information managing unit 63 can more quickly detect, based on the flag information (the flag signal), a significant change in the road to the extent that the vehicle behavior cannot be estimated from the shape of the road. That is, by using the flag signal indicating the deviation, it is possible to quickly notify the map server 3 that there has been a significant change in the road to the extent that the vehicle behavior cannot be estimated from the shape of the road, and thus prompt the map server 3 to update the high-precision map more quickly.

Concrete embodiments of the present invention have been described in the foregoing, but the present invention should not be limited by the foregoing embodiments and various modifications and alterations are possible within the scope of the present invention.

In the above embodiment, the high-precision map stored in the map server 3 is updated based on the probe information acquired by the probe information acquiring unit 33. However, the present invention is not limited to this embodiment. For example, the semi-static information, the semi-dynamic information, and the like of the dynamic map stored in the map server 3 may be updated based on the probe information. Further, the navigation map data stored in the navigation device 11 may be updated based on the probe information.

In the second embodiment, the road surface information includes the friction coefficient and presence/absence of a bump that is a bulging part on the road surface acquired by the external environment sensor 7. However, the present invention is not limited to this embodiment. For example, the road surface information may include gradient information on the road surface calculated based on an attitude angle detected by the vehicle sensor 8 (more specifically, the IMU).

In the above embodiment, the map information system 1 is composed of the vehicle and the map server 3. However, the present invention is not limited to this embodiment. The map information system may include other components (for example, a server configured to provide the weather information, a server configured to provide the road surface information on each road, or a server that provides the traffic congestion information) in addition to the vehicle and the map server 3.

In the above embodiment, the high-precision map is updated based on the turn signal operation detected by the turn signal lever sensor 13A. However, the present invention is not limited to this embodiment. For example, in a case where the probe information, which indicates that the turn signal operation has been detected by the turn signal lever sensor 13A and pressing on the brake pedal 12C has been detected by the brake sensor 13C in a plurality of vehicles, is transmitted to the map server 3 and the map server 3 determines that a lane whose travel direction is identical to the direction indicated by the turn signal operation of the probe information is present, the map server 3 may determine that the road may be narrowed by construction, an accident, or the like and update the semi-static information (information on construction or the like) of the dynamic map.

The invention claimed is:

1. A map information system, the system comprising:
   at least one vehicle; and
   a map server configured to communicate with the vehicle and store a high-precision map,
   wherein the vehicle includes:
   a turn signal lever sensor configured to detect a turn signal operation by a driver;
   an external environment sensor configured to acquire information on surroundings of the vehicle;
   an own vehicle position identifying device configured to identify a position of the vehicle; and
   a controller connected to the turn signal lever sensor, the own vehicle position identifying device, and the external environment sensor, and configured to transmit, to the map server, the turn signal operation, the position of the vehicle, and the information on the surroundings,
   wherein the map server updates the high-precision map based on the information acquired by the external environment sensor when comparing the high-precision map stored in the map server with the turn signal operation and determining that a branching route is present,
   wherein the at least one vehicle comprises a plurality of vehicles,
   wherein the map server is configured to acquire, from each of the vehicles, the turn signal operation detected by the turn signal lever sensor and the position of the vehicle where the turn signal operation is performed, and determine whether the high-precision map needs to be updated based on the information acquired from each of the vehicles, and
   wherein in a case where the high-precision map does not contain a road in a travel direction of one of the vehicles corresponding to the turn signal operation from the position of the one of the vehicles at detection of the turn signal operation, the map server determines whether travel histories of the vehicles after the turn signal operation are consistent with each other with respect to the vehicles traveling in a same travel direction, and
   wherein in a case where the travel histories of the vehicles after the turn signal operation are consistent with each other, the map server determines that the high-precision map needs to be updated.

2. The map information system according to claim 1, wherein the map server is configured to plot points indicating the travel histories of the vehicles after the turn signal operation, and determine whether the travel histories of the vehicles after the turn signal operation are consistent with each other based on density of the points indicating the travel histories.

3. The map information system according to claim 2, wherein the map server determines that the travel histories of the vehicles after the turn signal operation are consistent with each other when the density of the points indicating the travel histories is equal to or more than a prescribed threshold.

4. The map information system according to claim 1, wherein
   the external environment sensor includes an imaging device configured to capture an image around each of the vehicles, and
   the map server is configured to acquire road information on a road on which each of the vehicles has traveled after the turn signal operation based on the image from each of the vehicles captured by the imaging device, and update the high-precision map based on the road information.

5. The map information system according to claim 1, wherein the external environment sensor is configured to acquire road surface information on a road surface on which the corresponding vehicle travels,
   the controller is configured to transmit the road surface information acquired by the external environment sensor together with the position corresponding to the road surface information and identified by the own vehicle position identifying device, and
   the map server is configured to add the road surface information received from the controller to the high-precision map.

6. The map information system according to claim 1, further comprising:
   an acceleration sensor configured to acquire acceleration and/or deceleration of the corresponding vehicle; and
   a steering angle sensor configured to acquire a steering angle,
   wherein the controller is configured to acquire the high-precision map from the map server, extract a shape of a road on which the vehicle travels from the high-precision map, and notify the map server of inconsistency when the acceleration and/or deceleration acquired by the acceleration sensor or the steering angle acquired by the steering angle sensor is inconsistent with the extracted shape of the road.

\* \* \* \* \*